United States Patent [19]

Jansz et al.

[11] Patent Number: 5,021,231

[45] Date of Patent: Jun. 4, 1991

[54] PRODUCTION OF CHLORINE AND SODIUM SULPHATE

[75] Inventors: Just J. C. Jansz, The Hague; Gerhardus Santing, Arnhem, both of Netherlands

[73] Assignee: Shell Oil Company, Houston, Tex.

[21] Appl. No.: 518,614

[22] Filed: May 3, 1990

[30] Foreign Application Priority Data

May 5, 1989 [GB] United Kingdom ............... 8910387

[51] Int. Cl.$^5$ ............ C01B 7/01; C01D 5/02; C01G 49/14
[52] U.S. Cl. .................... 423/506; 423/504; 423/551; 423/558
[58] Field of Search ............. 423/506, 504, 505, 544, 423/551, 558

[56] References Cited

U.S. PATENT DOCUMENTS

| | | | |
|---|---|---|---|
| 2,254,014 | 8/1941 | Laury | 423/506 |
| 2,276,079 | 3/1942 | Maude | 423/502 |
| 2,445,117 | 7/1948 | Iler | 423/502 |
| 2,720,472 | 10/1955 | Miller | 423/551 |

FOREIGN PATENT DOCUMENTS 4116049  9/1966  Japan .................... 423/504

*Primary Examiner*—Gary P. Straub
*Assistant Examiner*—Brian M. Bolam

[57] ABSTRACT

A process for the preparation of chlorine and sodium sulphate which contains the steps of reacting sulphuric acid with sodium sulphate and ferric oxide or alumina, crystallizing and drying the resulting double salt trisodium-iron(III) sulphate or trisodium-aluminum sulphate and roasting the obtained trisodium-iron(III) sulphate or trisodium-aluminum sulphate with sodium chloride under the influence of oxygen thereby forming sodium sulphate, chlorine and ferric oxide or alumina.

14 Claims, No Drawings

PRODUCTION OF CHLORINE AND SODIUM SULPHATE

BACKGROUND OF THE INVENTION

1. Field of the Invention

The invention relates to a process for the preparation of chlorine and sodium sulphate.

2. Description of the Related Art

In the U.S. Pat. Nos. 2,254,014 (filed Nov. 21, 1939); 2,276,079 (filed July 29, 1939) and 2,445,117 (filed Dec. 23, 1939) are disclosed processes, whereby chlorine and sodium sulphate are produced. A disadvantage of the processes is that the chlorine produced is contaminated with sulphur dioxide, generally in equimolar amounts as can be easily seen from the reaction equations.

SUMMARY OF THE INVENTION

Applicant has now found a process, wherein chlorine is produced, which is not contaminated with substantial amounts of sulphur dioxide.

The invention relates to a process for the preparation of chlorine and sodium sulphate which comprises reacting sulphuric acid with sodium sulphate and ferric oxide or alumina, crystallizing and drying the resulting double salt trisodium-iron(III) sulphate or trisodium-aluminum sulphate and roasting the obtained trisodium-iron(III) sulphate or trisodium-aluminum sulphate with sodium chloride under the influence of oxygen thereby forming sodium sulphate, chlorine and ferric oxide or alumina.

DESCRIPTION OF THE INVENTION

The process according to the invention is carried out in two steps, generally according to the following reactions:

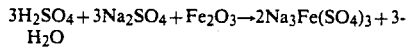

$$3H_2SO_4 + 3Na_2SO_4 + Fe_2O_3 \rightarrow 2Na_3Fe(SO_4)_3 + 3H_2O$$

and

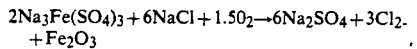

$$2Na_3Fe(SO_4)_3 + 6NaCl + 1.5O_2 \rightarrow 6Na_2SO_4 + 3Cl_2 + Fe_2O_3$$

where the numeral prefixes indicate the substantial relative molar ratios of the reactants and products.

The first reaction step may be carried out in the presence of water and at a temperature ranging from 20° C. to 180° C. preferably from 50° C. to 100° C. After the double salt has been crystallized out of the solution and has been separated from it the obtained double salt is subjected to a temperature in excess of 300° C. preferably to a temperature between 300° C. and 450° C. in order to remove all its water.

The second reaction step or roasting step is preferably carried out in a mechanical kiln, at a temperature between 450° C. and 800° C. preferably between 470° C. and 580° C.

The advantage of the process is that spent sulphuric acid may be used. Spent sulphuric acid may originate from different chemical processes, which either use sulphuric acid or which produce sulphuric acid as a byproduct. Spent sulphuric acid is becoming an ever increasing problem, since the acid effluent can not be disposed of due to environmental protection reasons. The process according to the invention specifically offers a solution to the problem of waste sulphuric acid produced by the titanium dioxide production.

A part of the sodium sulphate and of the ferric oxide produced in the roasting step may be recycled and used in the first step in order to prepare the double salt. The other part of the sodium sulphate which contains some impurities, such as magnesium sulphate, aluminum oxide and ferric oxide, may be neutralized with a base. e.g., sodium hydroxide. Ferric oxide and aluminum oxide can be separated as solid compounds and either recycled or stored.

Further treatment with a base, such as sodium hydroxide, separates magnesium hydroxide and other impurities and subsequently sodium sulphate is crystallized out and separated from the aqueous solution.

The process according to the invention has the advantage that chlorine is produced in commercial quantities without production of hydrochloric acid. Moreover the chlorine is not contaminated with sulphur dioxide or sulphur trioxide since the reaction conditions can be controlled to avoid such contamination.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLE

The invention will be described by the following example which is provided for illustrative purposes and is not to be construed as limiting the invention.

In a 10 liter double-walled glass vessel with a flat blade stirrer 6.7 kg of spent sulphuric acid were mixed with 3.7 kg of crude sodium sulphate. The spent sulphuric acid (as a 22%wt solution in water) contained as main impurities Fe, Al and Mg in the sulphate form. The crude sodium sulphate contained as main impurities ferric oxide, alumina and magnesium sulphate. The temperature was controlled at 70° C. by circulating hot oil through the vessel jacket. After 1 h a crystal mass was recovered by filtration: 7.4 kg. The crystal mass was subsequently dried in an electrically heated stainless steel rotary kiln at 400° C. during 1 h under introduction of air. The product contained mainly the double salts, i.e., sodium-iron sulphate and sodium-aluminium sulphate, of which the greater part was the sodium-iron sulphate double salt. The product was free of chemically bound water and weighed 5.8 kg.

The latter product was then mixed with 2.1 kg of finely ground sodium chloride (less than 63 lm) and roasted in a rotary kiln. The kiln was purged with dry air and was heated up to 520° C. in 1 h. The reaction was completed at 520° C. during the next full hour resulting in complete conversion of the sodium chloride into chlorine gas (1.28 kg). A peak in chlorine production was observed at about 90 minutes from the start of the reaction. In this roasting process the double salts reacted and decomposed into sodium sulphate and iron oxide (with alumina). The crude sodium sulphate was partly used in the preparation of the double salt. Another part of the crude sodium sulphate was mixed with water and sodium hydroxide and after removal of magnesium hydroxide, the sodium sulphate was crystallized out of the aqueous solution.

What is claimed is:

1. A process for the preparation of chlorine and sodium sulphate which comprises reacting sulphuric acid with sodium sulphate and ferric oxide or alumina, crystallizing and drying the resulting double salt trisodium-iron(III) sulphate or trisodium-aluminum sulphate and roasting the obtained trisodium-iron(III) sulphate or trisodium-aluminum sulphate with sodium chloride under the influence of oxygen thereby forming sodium sulphate, chlorine and ferric oxide or alumina.

2. A process according to claim 1, wherein the drying of trisodium-iron (III) sulphate is carried out at a temperature greater than 300° C.

3. The process according to claim 2, wherein the drying of trisodium-iron(III) sulphate is carried out at a temperature between 300° C. and 450° C.

4. The process according to claim 1 or 2, wherein the sulphuric acid is spent sulphuric acid in an aqueous medium.

5. The process according to claim 1, wherein the molar ratios of $H_2SO_4$: $Na_2SO_4$: $Fe_2O_3$ are about 3:3:1.

6. The process according to claim 1, wherein the roasting is carried out at a temperature between 450° C. and 800° C.

7. The process according to claim 6, wherein the roasting temperature is between 470° C. and 580° C.

8. The process according to claim 7, wherein the roasting reaction is performed in a mechanical kiln.

9. The process according to claims 1, 2, 7 or 8 wherein sodium sulphate and/or ferric oxide, obtained by the roasting step, is recycled to react with the sulphuric acid.

10. The process according to claim 9, wherein a part of the ferric oxide is recycled to react with the sulphuric acid and a part is removed.

11. The process according to claims 1, 2 or 7, wherein a part of the product of the roasting reaction is purified by reaction with a base.

12. The process according to claim 11, wherein the purified sodium sulphate product is further reacted with a base and magnesium impurity is removed as magnesium hydroxide.

13. The process according to claim 12, wherein sodium sulphate is crystallized and separated from the base-treated product of the roasting reaction.

14. A process for the preparation of chlorine and sodium sulphate which comprises reacting spent sulphuric acid with sodium sulphate and ferric oxide or alumina, crystallizing and drying the resulting double salt trisodium-iron(III) sulphate or trisodium-aluminum sulphate and roasting the obtained trisodium-iron(III) sulphate or trisodium-aluminum sulphate with sodium chloride under the influence of oxygen thereby forming sodium sulphate, chloride and ferric oxide or alumina wherein the spent sulphuric acid contains main impurities of Fe, Al, and Mg in the sulphate form and the crude sodium sulphate contains main impurities of ferric oxide, alumina, and magnesium sulphate; spent sulphuric acid and crude sodium sulphate are mixed at about 50° to 100° C. and the product is then dried in a mechanical rotary kiln at about 300° to 450° C. under introduction of air; the product is then mixed with ground sodium chloride and roasted in a rotary kiln at about 470° to 580° C.

* * * * *